Oct. 29, 1968    J. G. BENTLEY    3,407,857
PLANE
Filed Dec. 30, 1966    5 Sheets-Sheet 1
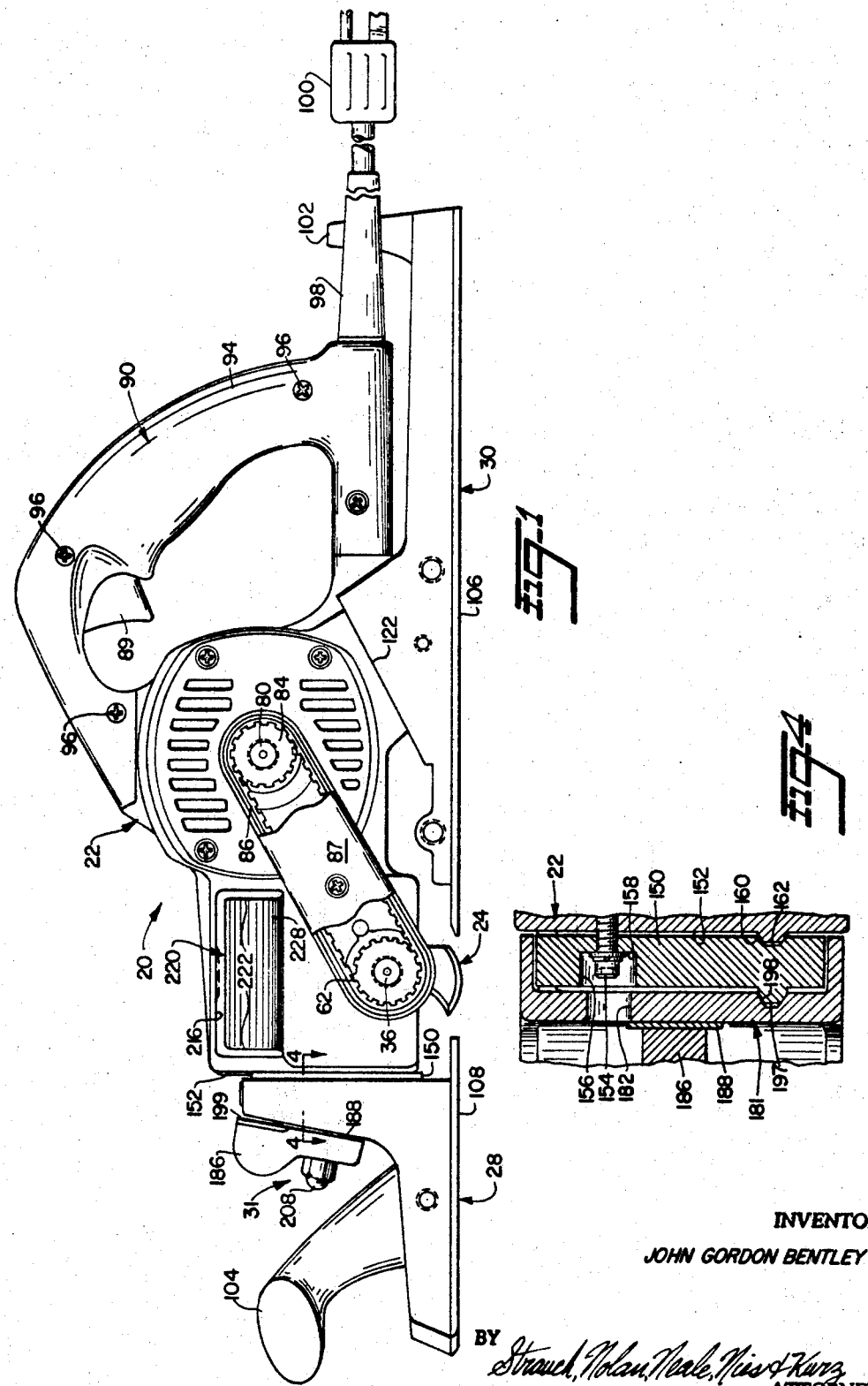
INVENTOR
JOHN GORDON BENTLEY
BY Strauch, Nolan, Neale, Nies & Kurz
ATTORNEYS

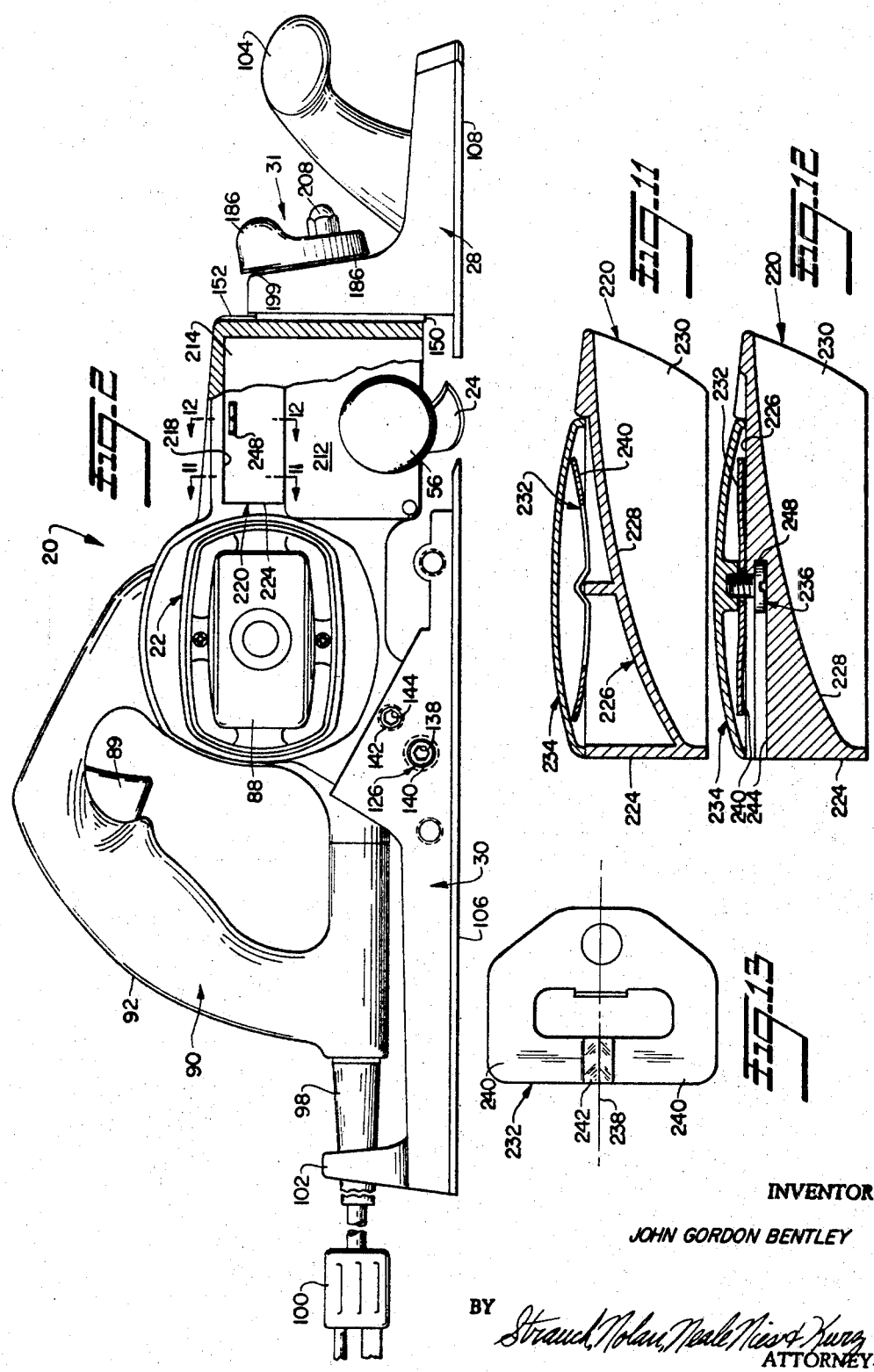

Oct. 29, 1968  J. G. BENTLEY  3,407,857
PLANE
Filed Dec. 30, 1966  5 Sheets-Sheet 3
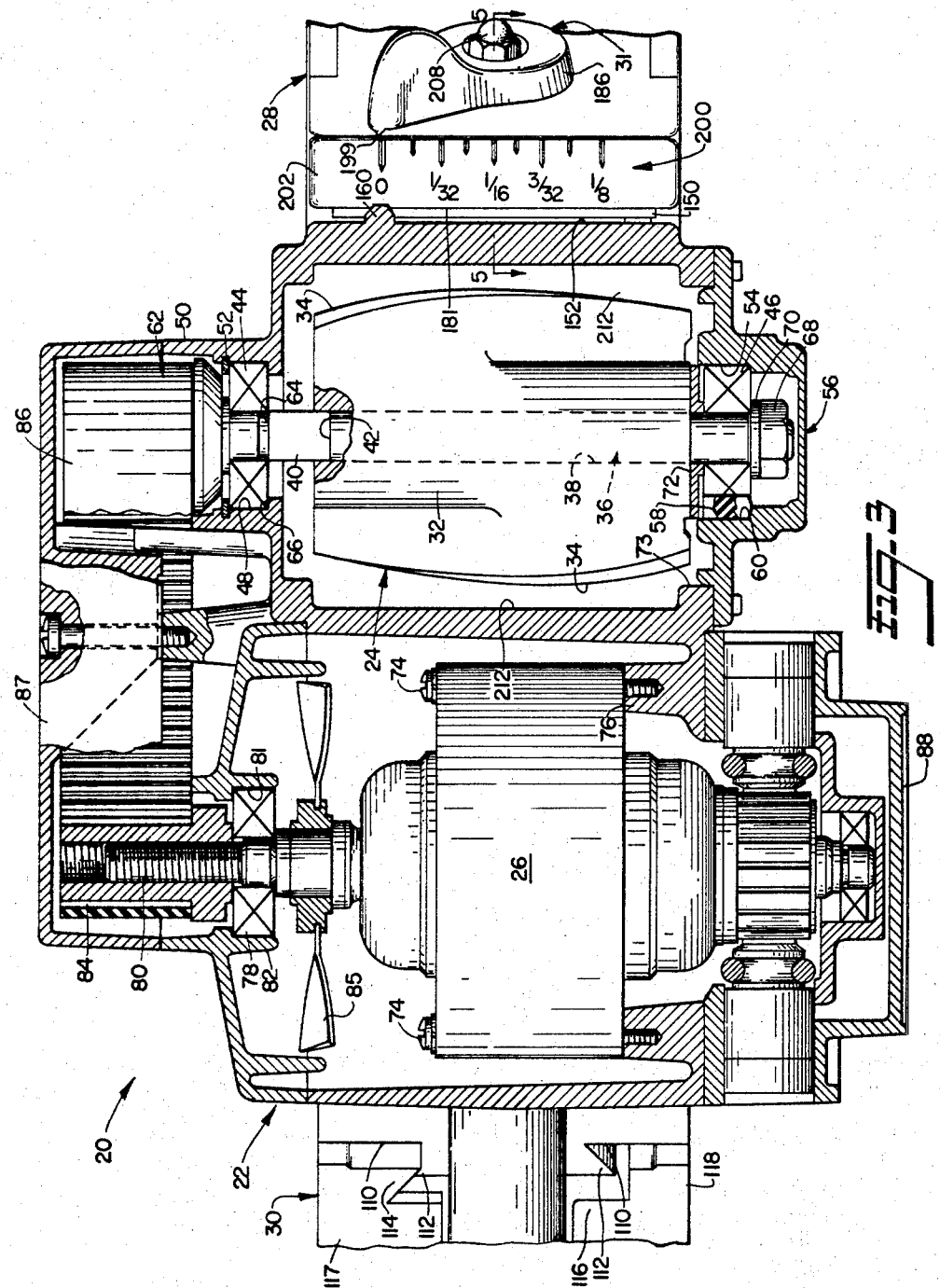
INVENTOR
JOHN GORDON BENTLEY
BY *Strauch, Nolan, Neale, Nies & Kurz*
ATTORNEYS

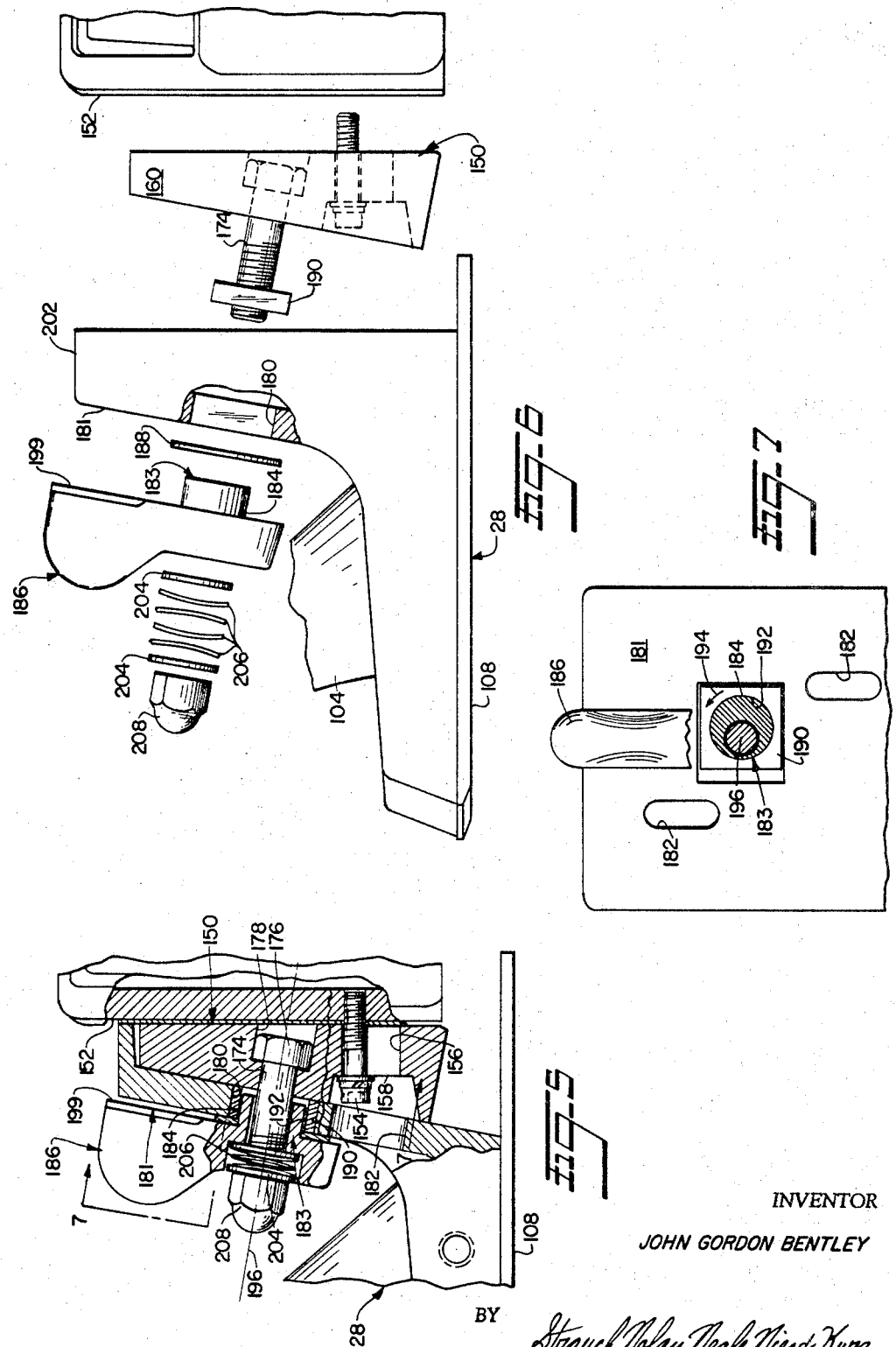

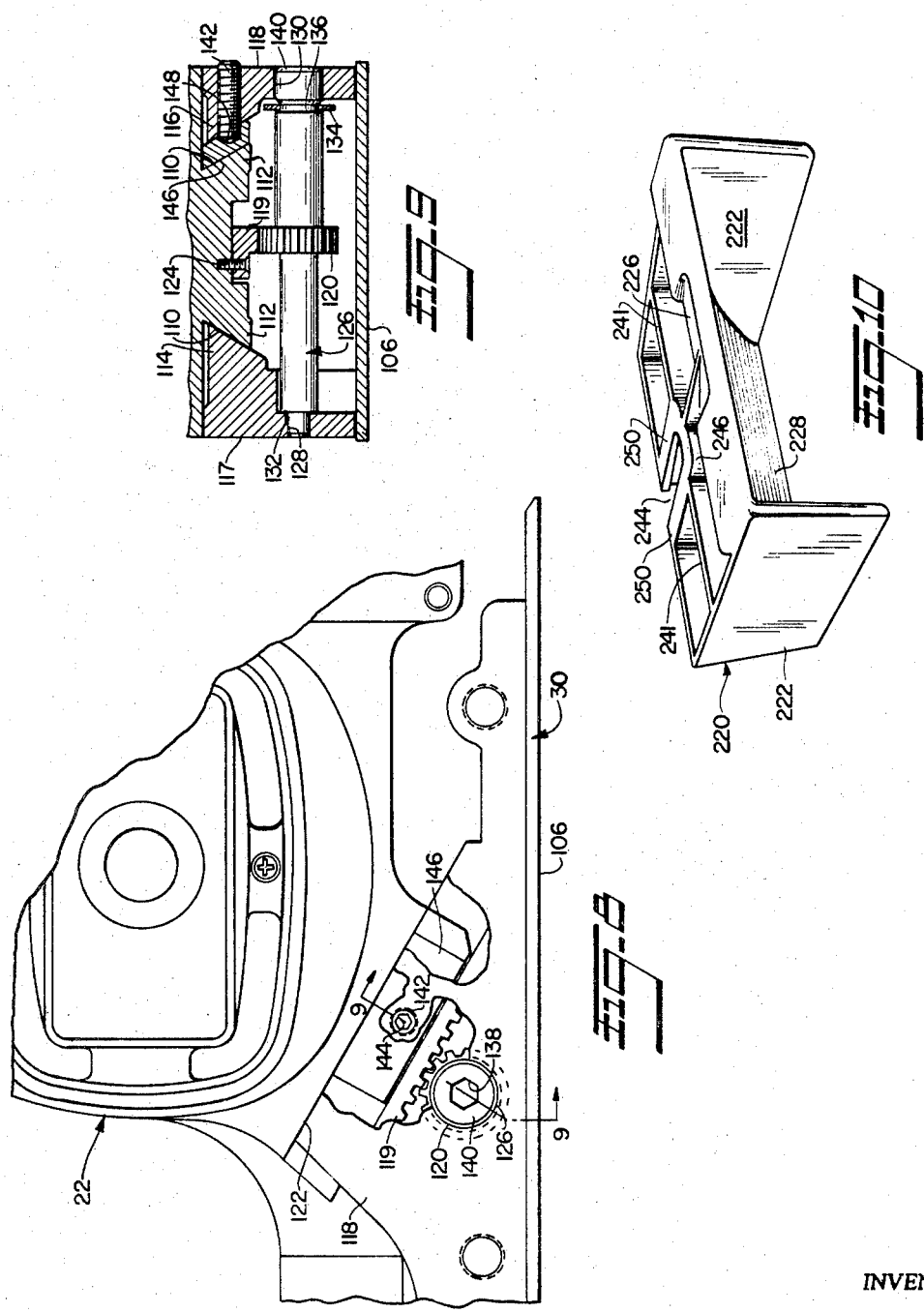

United States Patent Office 3,407,857
Patented Oct. 29, 1968

3,407,857
PLANE
John Gordon Bentley, Liverpool, N.Y., assignor to Rockwell Manufacturing Company, Pittsburgh, Pa., a corporation of Pennsylvania
Filed Dec. 30, 1966, Ser. No. 606,108
23 Claims. (Cl. 145—4)

ABSTRACT OF THE DISCLOSURE

A hand-manipulated, power-operated plane having an adjustable rear shoe, a front shoe with two adjustment mechanisms which are operable independently of each other and the rear shoe adjusting mechanism, and a reversible chip discharge chute.

---

This invention relates to planes and, more particularly, to planes of the hand-manipulated, power-operated type.

In planes of the type with which the present invention is concerned a rotatably mounted cutter is driven at high speed by an electric motor to smooth wood or reduce its dimensions. Front and rear shoes attached to the housing in which the cutter is mounted ride on and position the cutter in relation to the surface of the workpiece being planed to control the depth of cut.

Cutters employed in such planes are of two types. One includes a mandrel to which cutting blades are adjustably attached so that they can be aligned by moving them toward and away from the center of the mandrel. The second type of cutter is a one-piece or unitary construction in which the cutting edges are integral with the supporting mandrel.

The second type of cutter has important advantages over the first but has not heretofore been widely employed. This is because the diameter of such a cutter is necessarily reduced when it is sharpened, and there has heretofore been no satisfactory way of realigning the front and rear shoes with the reduced diameter cutter.

One heretofore proposed approach to this problem is disclosed in U.S. Patent No. 1,658,185 to Carter. In the latter's plane, the rear shoe is adjustable and can be moved relative to the cutter to compensate for changes in cutter diameter such as those caused by sharpening.

There is one serious drawback to Carter's arrangement. After the rear shoe is adjusted to compensate for a change in cutter diameter, the front shoe must be raised (or lowered) to realign it with the rear shoe, which gives the front shoe a new "zero depth of cut" position.

This has two disadvantages. First, in circumstances in which the cutter is raised, the readjustment reduces the maximum depth of cut which can be taken with the plane. Second, the depth of cut indicator will not indicate the correct depth of cut as no provision is made for adjusting it relative to the front shoe.

It is accordingly one important object of the present invention to provide novel improved planes of the type described above which have one-piece cutters and front and rear shoes that can be adjusted to compensate for changes in cutter diameter without adversely effecting the indications provided by the depth of cut indicator or reducing the maximum depth of cut which the plane is capable of making.

Other important and related objects are the provision of planes in accord with the preceding object, in which:

(1) Two independent arrangements are provided to align the front shoe with the rear shoe and to adjust the depth of cut so that the former adjustment does not interfere with the latter;

(2) All adjustments of the front and rear shoes can be quickly and accurately made;

(3) Both the front and rear shoes are accurately retained in the positions to which they are adjusted.

The foregoing and other important goals of the present invention are achieved by a novel construction in which the front shoe and the depth of cut adjusting mechanism are supported entirely from a mounting bracket which, in turn, is adjustable relative to the housing in which the cutter is supported. Accordingly, the front shoe can be aligned with the rear shoe without moving the depth of cut adjusting mechanism by moving the mounting bracket relative to the plane housing. Therefore, such alignment may be made without any adverse effects on subsequent depth of cut adjustments.

Complementary to the above-described shoe supporting arrangement are novel improved mechanisms for adjusting the rear shoe and the front shoe mounting bracket relative to the cutter supporting housing and for adjusting the front shoe in relation to its mounting bracket. These improvements permit the necessary adjustments to be quickly and accurately made and insure that the front and rear shoes and the front shoe mounting bracket remain in the positions to which they are adjusted.

Another problem commonly encountered in heretofore available power-operated planes is the lack of a satisfactory system for disposing of the dust and chips generated by the rapidly rotating cutter.

In previously known planes the chips and dust are generally discharged through a passage which extends upwardly through the plane and terminates in an opening through one side of the plane. The disadvantage of this arrangement is that it is many times disadvantageous to have the wood chips and dust blown from the plane in the particular direction dictated by the outlet opening.

Accordingly, a further important object of the present invention resides in the provision of a novel chip discharge arrangement which provides greater flexibility in the direction in which the chips are discharged and, at the same time, accomplishes this goal in an extremely simple manner.

In general the foregoing and related objects are accomplished by providing outlets for the chips and dust on both sides of the plane housing and by employing a chip discharge chute which can be inserted into the housing through either of these outlets to direct the chips and dust through it and block the other outlet opening. A spring type catch is preferably employed in this arrangement to removably retain the discharge chute in position in the housing of the plane.

Other important objects of the present invention include the provision of novel, improved cutter mounting arrangements for planes of the type described.

Further novel features, additional important objects, and other significant advantages of the present invention will become more fully apparent from the appended claims and as the ensuing detailed description and discussion proceeds in conjunction with the accompanying drawing, in which:

FIGURE 1 is a left-hand side view of a hand-manipulated, power-operated plane constructed in accord with the principles of the present invention with one cover partly broken away to show the drive connection between the cutter of the plane and its motor;

FIGURE 2 is a right-hand side view of the plane of FIGURE 1 with part of the main housing broken away to show the chip discharge passage;

FIGURE 3 is a horizontal section through the plane of FIGURE 1, showing its internal construction;

FIGURES 4 and 5 are partial sections through the forward end of the plane, taken substantially along lines 4—4 of FIGURE 1 and 5—5 of FIGURE 3, respectively (with the latter section being rotated 180°), to show the manner in which the front shoe of the plane and the depth of cut mechanism are attached to the front shoe mounting bracket and the manner in which the latter is attached to the main housing of the plane;

FIGURE 6 is an exploded view of the components shown in FIGURE 5;

FIGURE 7 is a view of the components shown in FIGURE 5, taken substantially along line 7—7 of the latter figure;

FIGURE 8 is a fragmentary side view of the rear end of the main housing and the rear shoe of the plane with portions of the housing and shoe broken away to show the manner in which the shoe is supported from the housing and the mechanism provided to adjust the shoe up and down relative to the housing;

FIGURE 9 is a section through the components illustrated in FIGURE 8, taken substantially along line 9—9 of the latter figure;

FIGURE 10 is perspective view of a reversible chip discharge chute employed in the plane of FIGURE 1 to provide increased flexibility in the direction in which the chips and dust generated by the cutter are discharged;

FIGURES 11 and 12 are sections through the chip discharge chute and a spring type retainer employed to removably fix the chip discharge chute in the housing of the plane, taken substantially along lines 11—11 and 12—12, respectively, of FIGURE 2; and FIGURE 13 is a plan view of the retainer.

Referring now to the drawing, FIGURES 1 and 3 depict a hand-manipulated, power-operated plane 20 embodying and constructed in accord with the principles of the present invention. The main components of plane 20 include a housing 22 in which a one-piece, spiral type, rotating cutter 24 is mounted together with a motor 26 drive-connected to the cutter. Attached to the front and rear ends of housing 22 are adjustable front and rear shoes 28 and 30 which position cutter 24 relative to the surface of the workpiece being planed and therefore control the depth of the cut made by it. An adjusting mechanism 31 is provided so that the depth of cut can be varied as needed for particular tasks.

Referring now specifically to FIGURE 3, cutter 24 is of integral construction and includes a central body portion or mandrel 32 and two oppositely disposed spiral or helical cutting edges 34.

Cutter 24 is journalled on a shaft 36, which extends through a central bore 38 in the cutter. It is fixed to the shaft for rotation therewith by lugs 40 on the shaft (only one of which is shown), which fit into correspondingly configured recesses 42 (only one of which is shown) in the lower end of the cutter.

Opposite ends of shaft 36 are rotatably journalled in frictionless bearings 44 and 46. Bearing 44 is mounted in a recess 48 formed in a transversely extending boss 50 of main housing 22 and is retained in place by a retainer ring 52. Bearing 46 is seated in a recess 54 formed in a removable cap 56 attached to housing 22 by screws or other suitable fasteners (not shown). Bearing 46 is frictionally retained in recess 54 by rubber plugs 58 (only one of which is shown) disposed in apertures 60 opening onto recess 54. Plugs 58 also absorb and reduce vibration from cutter 24.

Shaft 36 is located transversely in housing 22 by a pinion 62 threaded onto one end of the shaft and by retainer 52, bearing 44, and a shoulder 64 on the shaft adjacent bearing 44. Pinion 62 and bearing 44 prevent shaft 36 from moving downwardly as shown in FIGURE 3 since bearing 44 bears against a seat 66 at the inner end of recess 48. Retaining ring 52 prevents the bearing from moving upwardly as shown in FIGURE 3; and shaft 36 can consequently not move upwardly because of the engagement between its shoulder 64 and bearing 44.

Cutter 24 is positioned along shaft 36 at one end by cooperating lugs 40 and recesses 42 and, at the other, by nut 68, washer 70, bearing 46, and spacer 72, which maintain firm engagement between the cutter and lugs 40 on shaft 36.

The cutter mounting arrangement described above is an important feature of the present invention as it permits the cutter to be quickly and easily removed for sharpening. Specifically, after dust cover 56 and nut 68 are removed, washer 70, bearing 46, spacer 72, and cutter 24 can be slid off shaft 36 and removed through opening 73 in housing 22.

Referring still to FIGURE 3, the motor 26 drive-connected to cutter 24 is of conventional construction and is mounted transversely in housing 22. The motor is fixed in place by screws 74, which are threaded into a mounting boss 76 on the inside of the housing, and by a conventional frictionless bearing 78 in which motor output shaft 80 is journalled. Bearing 78, in turn, is mounted in a recess 81 formed in a boss 82 extending inwardly from housing 22.

A drive pinion 84 is threaded onto motor output shaft 80 and rotates with the latter along with a conventional fan 85 provided to prevent the motor from overheating. Pinion 84 is connected to the pinion 62 on cutter shaft 36 by an endless, flexible toothed belt 86 thus drive connecting motor 26 to cutter 24. This type of belt is particularly advantageous since it provides a positive yet quiet and vibrationless connection between the two pinions.

A removable cover 87 protects the drive train against dust generated by the cutter and other foreign matter. A similar cover 88 protects motor 26 while facilitating access to it when necessary.

Motor 26 is energized by depressing a switch 89 mounted in a handle 90 having one section 92 integral with housing 22 and a second section 94 removably attached to section 92 as by screws 96. Removal of handle section 94 exposes the leads (not shown) connecting motor 26 to switch 89 and the connections between the switch and a flexible power cord 98 provided with a plug 100 for connecting the plane to a source of alternating current.

An upstanding integral projection 102 at the aft end of rear shoe 30 biases power cable 98 to one side or the other to prevent it from interfering with the operation of plane 20 as discussed in U.S. Patent No. 2,774,399 to Emmons.

The handle construction, switch, and motor described briefly above are conventional and are not part of the present invention. It is therefore not considered necessary to describe them further herein.

The operation of the plane 20 descirbed above is thought to be apparent from the foregoing description of its major components. Briefly speaking, however, plane 20 is positioned with front shoe 28 on the surface of the workpiece (not shown) from which it is desired to remove a cut. Switch 89 is then closed, energizing motor 26 which, in turn, drives cutter 24. The operator then pushes plane 20 along the workpiece by means of handle 90 and a T-shaped handle 104 fixed in any convenient fashion to front shoe 28. Cutter 24 removes a cut of material of a thickness determined by the adjustment of mechanism 31 from the workpiece as plane 20 is moved along it. After the plane has moved a short distance, rear shoe 30 will move onto the planed surface and will ride over it.

The facilitate the guiding of plane 20 along the workpiece and the making of angle cuts, it will normally be provided with a depending guide (not shown) which is not part of the present invention and has been omitted to simplify the drawing.

Cutter 24 will necessarily be sharpened periodically to maintain sharp cutting edges. Sharpening requires the removal of metal from the cutter, which results in a reduction in the cutter diameter. After sharpening cutter 24, therefore, it is necessary to realign the front and rear shoes 28 and 30 of the plane relative to the cutter. This is accomplished by elevating the rear shoe until its work engaging surface 106 is tangent to the periphery of the cutter. Front shoe 28 is then adjusted so that its work engaging surface 108 is in the same plane as the work engaging surface 106 of the rear shoe.

Referring now to FIGURES 1, 2, 8, and 9, rear shoe 30 is slidably mounted on main housing 22 by two longitudinally extending, parallel ways or recesses 110 formed in the rear part of the housing. Ways 110, which are inclined at an angle (typically on the order of 30 degrees) to the longitudinal centerline of plane 20, provide outwardly directed shoe supporting projections 112. Cooperating, inwardly extending projections 114 and 116 are formed in triangularly configured side walls 117 and 118 of shoe 30. As best shown in FIGURE 9, this provides a dovetail arrangement which supports rear shoe 30 from housing 22 of plane 20 while permitting the shoe to move longitudinally of the housing.

Movement of rear shoe 30 relative to housing 22 elevates or lowers its work engaging surface 106 relative to the periphery of cutter 24, thereby permitting the rear shoe to be adjusted with respect to the cutter periphery for the purposes described above. To accurately control the longitudinal movement and, therefore, the raising and lowering of the shoe, a cooperating rack 119 and pinion 120 are employed. Rack 119 extends longitudinally of the plane and is fastened to inclined lower surface 122 of housing 22 between shoe supporting projections 112 as by screws 124.

Pinion 120 is fixed to a transversely extending shaft 126 for rotation therewith. Shaft 126 is supported with pinion 120 and rack 119 in meshing engagement in openings 128 and 130 in the side walls 117 and 118 of shoe 30. Shaft 126 is retained in place by an annular shoulder 132 on it, which abuts side wall 117, and a snap ring retainer 134 disposed in an annular groove 136 in the shaft adjacent shoe side wall 118.

As best shown in FIGURE 8, a hexagonal socket 138 is formed in the outer end 140 of shaft 126. Accordingly, shaft 126 and pinion 120 may be rotated by an Allen wrench or the like.

As will be apparent from the foregoing, rear shoe 30 is adjusted relative to the periphery of cutter 24 by turning shaft 126. Shaft 126, in turn, rotates pinion 120, causing it to roll along rack 119. This moves shoe 30 along the ways formed in plane housing 22, raising or lowering the rear shoe relative to the periphery of cutter 24. The novel rack and pinion type mechanism described above permits this adjustment to be made with a high degree of accuracy.

Rear shoe 30 is retained in the position to which it is adjusted by a setscrew 142 which is threaded through side wall 118 of shoe 30. A hexagonal socket 144 on its outer end permits it to be conveniently rotated by an Allen wrench. As best shown in FIGURE 9, the inner end of screw 142 engages a wear plate 146 disposed between rear shoe side wall 118 and the adjacent projection 112 on housing 22. A blind aperture 148 is provided in wear plate 146 to receive the inner end of screw 142 and thereby prevent the wear plate from moving relative to shoe 30. When screw 142 is tightened, wear plate 146 is clamped against housing projection 112; and the resulting friction prevents shoe 30 from moving relative to the housing.

Wear plate 146 may be omitted and setscrew 142 engaged directly with housing projection 112, if desired. The use of a wear plate is preferred, however, since the shoe and housing will normally be made of a relatively soft metal such as aluminum which could be damaged by the setscrew. The wear plate, which will typically be made of steel, is not subject to such damage.

One of the novel and important features of the present invention is that, after rear shoe 30 has been adjusted in the manner just described, the work engaging surface 108 of front shoe 28 can be adjusted to the same plane as the work engaging surface of the rear shoe without using depth of cut adjusting mechanism 31. Accordingly, such adjustment of the front shoe does not affect the zero adjustment of the depth of cut mechanism or reduce the maximum depth of cut for which the plane can be adjusted.

Referring now to FIGURES 1, 2, 4, and 5, the novel mechanism by which the foregoing adjustment is accomplished includes a front shoe mounting bracket 150 to which the front shoe is attached by depth of cut adjusting mechanism 31. Shoe mounting bracket 150 is attached to the front vertical wall 152 of plane housing 22 by two Allen head screws 154. Screws 154 extend through vertically elongated apertures 156 in bracket 150 with their heads abutting ledges 158 in the recesses and are threaded into housing wall 152.

To align the work engaging surface 108 of front shoe 28 with the work engaging surface 106 of rear shoe 30, depth of cut adjusting mechanism 31 is set to the zero cut position. Allen head screws 154 are then loosened, and mounting bracket 150 is moved up or down until the work engaging surface 108 of front shoe 28 lies in the same plane as the work engaging surface 106 of the previously adjusted rear shoe 30. Allen head screws 154 are then tightened to retain the mounting bracket in the adjusted position.

From the foregoing, it will be apparent that the depth of cut adjusting mechanism 31 remains in its zero position while the foregoing adjustment is being made. Accordingly, this adjustment neither effects the zero position of the latter mechanism nor reduces the maximum depth of cut which may be made. Both of these undesirable effects would necessarily result if the foregoing adjustment were made by manipulation of the depth of cut adjusting mechanism.

To confine front shoe mounting bracket 150 to up and down movement relative to plane housing 22, a vertically extending lug or projection 160 is formed on front wall 152 of the housing. This lug fits into a correspondingly configured recess 162 in the mounting bracket and, accordingly, limits the relative movement between the two components to that desired.

With front and rear shoes 28 and 30 of plane 20 aligned in the manner described above and depth of cut adjusting mechanism 31 set to its zero position, the work engaging surfaces 108 and 106 of the two shoes lie in the same plane as the periphery of cutter 24. Consequently, no wood will be removed by cutter 24 in this setting. Plane 20 is accordingly next adjusted so that it will take a cut as it is moved over the workpiece. This is done by manipulating adjusting mechanism 31 to elevate front shoe 28 relative to its mounting bracket and expose cutter 24 to a depth equal to the desired depth of cut.

Referring now to FIGURES 1, 2, and 4–7, mechanism 31 includes a threaded shaft or bolt 174 with its head 176 seated in a recess 178 on the rear side of bracket 150. Recess 178 has a configuration (not shown) matching that of the bolt head to prevent it from rotating relative to the mounting bracket.

As best shown in FIGURE 5, bolt 174 extends forwardly from bracket 150 through an aperture 180 in a vertical transverse wall member 181 of shoe 28 provided with slots 182 through which Allen head screws 154 can be reached. Rotatably mounted on bolt 174 in aperture 180 is an eccentric or cam 183 with a peripheral cam surface 184 and an integral handle 186 by which the cam may be rotated. A washer 188 is disposed between handle 186 and the vertical transverse wall 181 of front shoe 28 to prevent the latter from binding as it is rotated relative to the shoe.

Cam 183 is connected in motion transmitting relationship to front shoe 28 by a rectangularly configured insert 190 which surrounds the cam and is also disposed in the aperture 180 through wall 181 of the shoe. As best shown in FIGURE 7, the central aperture 192 of the insert, through which cam 183 extends, is of virtually the same dimensions as the cam. The vertical dimensions of insert 190 and aperture 180 are approximately the same, but aperture 180 is considerably wider.

To elevate front shoe 28 to provide the desired depth of cut, lever or handle 186 is moved counterclockwise as shown in FIGURE 7, rotating cam 183 in the direction shown by arrow 194. Rotation of cam 183 in this direction moves front shoe 28 upwardly relative to supporting bracket 150 since it increases the distance between the fixed axis of rotation 196 and the periphery 184 of the cam. This moves insert 190 upwardly with respect to the center of rotation which, in turn, moves the front shoe upwardly relative to axis 196 and supporting bracket 150 since there is no relative movement between the bracket and axis 196.

Front shoe 28 is confined to vertical or up and down movement relative to its mounting bracket 150 by a vertically extending projection 197 on the front face of the bracket, which fits into a correspondingly configured vertically extending recess 198 in the rear face of the transverse wall 181 of shoe 28. With shoe 28 thus confined to up and down movement, insert 190 slides laterally in recess 178 as the horizontal distance between axis 196 and cam surface 184 increases, preventing cam 183 from binding.

Referring now to FIGURE 3, a pointer 199 is formed on lever 186, and a cooperating scale 200 is stamped or otherwise formed in the top surface 202 of the transversely extending front shoe wall 181. The pointer and scale indicate the depth of cut for which the plane is set. Since pointer 199 remains at zero on this scale while the front shoe is being adjusted to compensate for changes in cutter diameter, the pointer and indicator always indicate the precise depth of cut which will be made by the plane.

Referring now to FIGURES 5 and 6, two plain washers 204 and two pairs of spring washers 206 are assembled on bolt 174 adjacent cam lever 186 with the two spring washers in each pair arranged in mirror image relationship. The foregoing washers, as well as the other components assembled on the bolt and described previously, are retained on it by a nut 208.

Spring washers 206 bias lever 186 against washer 188 and the latter against transversely extending wall 181 of front shoe 28. This provides frictional forces between the operating lever and shoe 28 and between shoe 28 and mounting bracket 150 capable of maintaining the shoe in the position to which it is adjusted. This force can be adjusted, if necessary, by threading nut 208 along bolt 174.

Referring now to FIGURES 1, 2, and 11–13, a further important feature of the present invention is the novel arrangement, described briefly above, which is provided so that chips and dust generated by cutter 24 may be discharged from either side of plane 20, as desired. As best shown in FIGURE 2, the compartment 212 in which cutter 24 is located extends upwardly through housing 22 providing a discharge passage 214 for dust and chips generated by cutter 24. Discharge passage 214 terminates in identical outlets 216 and 218 on opposite sides of housing 22. The dust and chips may accordingly be discharged through either of the two outlets.

The outlet through which this material is discharged is controlled by a chip discharge chute 220, which is best shown in FIGURES 10–12. Chute 220 has two parallel, spaced apart side walls 222, a rear wall 224, and a top wall 226. It also has a generally concave lower surface 228 including the lower side of top wall 226 and front side of rear wall 224 so configured as to deflect dust and chips moving upwardly through passage 214 in a horizontal direction. The end 230 of the discharge chute opposite end wall 224 is open, providing an outlet for chips and dust discharging through the chute.

Chip discharge chute 220 may be inserted laterally into discharge passage 214 through either of the outlet openings 216 or 218. The rear wall 224 of the chute blocks the flow of chips and dust through the outlet opening on the opposite side of the plane, and this material is accordingly discharged from the plane through the opening into which the chute is inserted. For example, if the chute is inserted through opening 216, as shown in FIGURE 1, rear wall 224 of the chute prevents chips from flowing through outlet opening 218, as is apparent from FIGURE 2, but permits this material to be discharged through outlet 216, as shown in FIGURE 1.

Chip discharge chute 220 is retained in discharge passage 214 by a spring type catch or retainer 232 fastened to the lower side of plane housing top wall 234 as by a screw 236 (see FIGURE 13). Spring 232, which is symmetrical relative to a longitudinal centerline 238, has two identical, generally U-shaped legs 240. Legs 240 have a slight downward bow, as shown in FIGURE 12, so that they are displaced upwardly by chute 220 as it is inserted into passage 214. When the chute reaches the proper position in the passage, one of two identical ribs 241 (see FIGURE 10) on discharge chute top wall 226 is directly below a recess 242 formed in spring 232. This permits the spring leg displaced upwardly by the insertion of the chute to snap downwardly, engaging rib 241 in recess 242 to removably retain the chute within passage 214.

As best shown in FIGURES 10 and 12, an elongated, T-sectioned slot 244 is formed in a boss 246 extending upwardly from the top wall 226 of the discharge chute. The head 248 of screw 236 slides through this slot as the discharge chute is inserted. The screw head engages the lower side of flanges 250 on opposite sides of slot 244, preventing the closed end 224 of the chute from dropping downwardly in passage 214.

Discharge chute 220 can be readily removed from plane 20 by simply pulling its open end laterally with sufficient force to displace the spring leg 240 nearest this end of the chute and permit rib 241 to ride out of retaining recess 242. Accordingly, the position of the discharge chute in plane 20 may be quickly reversed to alter the direction in which the chips and dust generated by cutter 24 are discharged as circumstances warrant.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A hand-manipulated, power-operated plane comprising a housing, a cutter journalled in said housing for rotation about an axis extending transversely of the housing, a motor mounted in the housing and operatively connected to said cutter to effect rotation thereof, a front shoe having a work engaging surface extending forwardly from said cutter, a rear shoe carried by said housing and extending rearwardly from said cutter, said rear shoe having an elongated, flat, work engaging surface parallel to the work engaging surface of said front shoe, rack and pinion means for compensating for changes in the diameter of the cutter by adjusting said rear shoe relative to said housing so that the work engaging surface of the rear shoe is in predetermined relation to a plane tangential to the exposed periphery of said cutter, and means carried by said rear shoe for locking said shoe in the position to which it is adjusted by said rack and pinion means.

2. A hand-manipulated, power-operated plane comprising a housing, a cutter journalled in said housing for rotation about an axis extending transversely of the housing, a motor mounted in the housing and operatively connected to said cutter to effect rotation thereof, a front shoe having a work engaging surface extending forwardly from said cutter, a rear shoe carried by said housing and extending rearwardly from said cutter, said rear shoe having an elongated, flat, work engaging surface parallel to the work engaging surface of said front shoe, means for compensating for changes in the diameter of the cutter by adjusting said rear shoe relative to said housing so that the work engaging surface of the rear shoe is in predetermined relation to a plane tangential to the exposed periphery of said cutter, and means for locking said rear shoe in the position to which it is adjusted, the portion of said housing carrying said rear shoe being inclined at an angle to the work engaging surface of said shoe and the means for adjusting said rear shoe comprising a rack fixed to one of said housing and rear shoe components and a pinion rotatably mounted on the other of said components and engaged with said rack, whereby rotation of said pinion moves said rear shoe relative to said inclined housing portion to thereby raise and lower said shoe relative to the periphery of said cutter, and means accessible from the exterior of said plane for rotating said pinion.

3. The power-operated plane of claim 2, together with means comprising cooperating elongated ways in said rear shoe and the portion of said housing carrying said shoe on both sides thereof to guide the movement of said shoe along said housing and to prevent movement of said shoe toward and away from said housing portion.

4. A hand-manipulated, power-operated plane comprising a housing, a cutter journalled in said housing for rotation about an axis extending transversely of the housing, a motor mounted in the housing and operatively connected to said cutter to effect rotation thereof, a front shoe having a work engaging surface extending forwardly from said cutter, a rear shoe carried by said housing and extending rearwardly from said cutter, said rear shoe having an elongated, flat, work engaging surface parallel to the work engaging surface of said front shoe, means for compensating for changes in the diameter of the cutter by adjusting said rear shoe relative to said housing so that the work engaging surface of the rear shoe is in predetermined relation to a plane tangential to the exposed periphery of said cutter, and means for locking said rear shoe in the position to which it is adjusted including a deformation resistant plate between said rear shoe and the portion of the housing carrying said shoe and a stop threaded through said shoe into engagement with said plate to clamp said plate against said housing portion and thereby prevent movement of said shoe relative to said housing.

5. A hand-manipulated, power-operated plane comprising a housing, a cutter journalled in said housing for rotation about an axis extending transversely of the housing, a motor mounted in the housing and operatively connected to said cutter to effect rotation thereof, a rear shoe carried by said housing and extending rearwardly from said cutter, said rear shoe having an elongated, flat, work engaging surface, a front shoe having a work engaging surface extending forwardly from said cutter in parallel relation to the work engaging surface of said rear shoe, means for positioning the work engaging surface of said front shoe relative to the work engaging surface of the rear shoe to thereby establish a zero cut position of said cutter, and means independent of said positioning means for elevating and lowering said front shoe relative to said housing to adjust the depth of cut of said cutter.

6. A hand-manipulated, power-operated, plane comprising a housing, a cutter journalled in said housing for rotation about an axis extending transversely of the housing, a motor mounted in the housing and operatively connected to said cutter to effect rotation thereof, a rear shoe carried by said housing and extending rearwardly from said cutter, said rear shoe having an elongated, flat, work engaging surface, a front shoe having a work engaging surface extending forwardly from said cutter in parallel relation to the work engaging surface of said rear shoe, a shoe mounting bracket supporting said front shoe from said housing, means for fixing said mounting bracket to said housing at selectively variable elevations to align the work-engaging surface of the front shoe relative to the work engaging surface of the rear shoe and thereby establish a zero cut position of the cutter, and means for elevating said front shoe relative to said mounting bracket to adjust the depth of cut of said cutter and for fixing said shoe to said mounting bracket.

7. The power-operated plane of claim 6, wherein the means fixing said shoe mounting bracket to said housing comprises slots in said bracket and fasteners extending through said slots and adapted when tightened to clamp said bracket against said housing, said slots being vertically elongated, whereby said mounting bracket can be moved up and down relative to said fasteners to position it relative to said housing and thereby position said front shoe relative to the rear shoe carried by said housing.

8. The power-operated plane of claim 6, wherein all movement between said bracket and said housing except that elevating and lowering said bracket relative to said rear shoe is precluded by an elongated recess formed in one of the aforesaid components and a cooperating projection formed on the other of said components and seated in said recess.

9. The power-operated plane of claim 6, wherein the last-mentioned means incldes a cylindrical cam, means mounting said cam for rotation about an axis fixed relative to said mounting bracket, the cam surface of said cam being operatively engaged with said front shoe and being eccentrically located relative to said axis of rotation, whereby rotation of said cam about said axis moves said shoe relative to said mounting bracket, and means confining the movement of the front shoe relative to the mounting bracket to directions in which said movement elevates or lowers the front shoe relative to the rear shoe.

10. The power-operated plane of claim 9, wherein the cam mounting means is a shaft fixed to said mounting bracket and extending through an aperture in said mounting shoe, said cam being disposed in said opening and connected to said shoe by a motion transmitting insert disposed in said opening and having a central opening into which said cam fits, the vertical diminsion of said insert approximating the vertical dimension of the opening in the front shoe.

11. The power-operated plane of claim 9, wherein the means confining relative movement between the front shoe and mounting bracket to directions in which the movement elevates or lowers the shoe relative to the bracket comprises an elongated recess in one of the aforesaid components, the other of said components having thereon a cooperating projection seated in said recess.

12. The power-operated plane of claim 9, together with biasing means for frictionally opposing rotation of said cam and thereby retaining said front shoe in the position to which it is adjusted.

13. The power-operated plane of claim 12, together with means for varying the frictional force exerted by said biasing means.

14. The power-operated plane of claim 9, together with a handle fixed to said cam to facilitate the rotation of said cam and consequent adjustment of said front shoe.

15. The power-operated plane of claim 14, together with an indicator on said handle and a cooperating scale on said shoe for indicating the depth of cut for which said front shoe has been adjusted.

16. A hand-manipulated, power-operated plane comprising a housing, a cutter journalled in the housing for rotation about an axis extending transversely of the housing, a motor mounted in the housing and operatively connected to said cutter to effect rotation thereof, a rear shoe carried by said housing and extending rearwardly from said cutter and having an elongated flat work engaging surface, means for moving said rear shoe relative to said housing so as to adjust the work engaging surface of said rear shoe to a predetermined position relative to the exposed periphery of said cutter in order to compensate for changes in the diameter of said cutter, a front shoe having a work engaging surface extending forwardly from said cutter in parallel relation to the work engaging surface of said rear shoe, means for elevating and lowering the work engaging surface of said front shoe relative to the work engaging surface of the rear shoe to thereby establish a zero cut position of said cutter, and means independent of said positioning means for elevating said front shoe relative to said housing to adjust the depth of cut of said cutter.

17. A hand-manipulated, power-operated plane comprising a housing, a cutter journalled in said housing for rotation about an axis extending transversely of the housing, a peripheral portion of the cutter being exposed beneath said housing, a motor mounted in said housing and drive-connected to said cutter to effect rotation thereof, means providing a passage for chips generated by said cutter extending through said housing and terminating in openings on both sides of the housing, and a reversible chip discharge chute insertable into said passage through either of said openings for reflecting to the chosen side of said plane the chips generated by said cutter.

18. A hand-manipulated, power-operated plane comprising a housing having a cutter compartment formed therein, a cutter disposed in said compartment and journalled in said housing for rotation about an axis extending transversely of the housing, a motor mounted in said housing and drive-connected to said cutter to effect rotation thereof, said cutter compartment extending upwardly in said housing above said cutter and terminating in openings on both sides of the housing, a reversible chip discharge chute insertable into said compartment through either of said openings for deflecting to the chosen side of said plane the chips generated by said cutter, and retainer means attached to the housing and disposed in said compartment for detachably fixing said chip discharge chute to said housing.

19. The power-operated plane of claim 18, wherein said chip discharge chute has oppositely located open and closed ends adapted to cooperate with the openings through said housing and a concave lower surface extending between said ends and configured to deflect upwardly moving chips laterally through the open end of said chip discharge chute and the opening through said housing thereadjacent, the closed end of said discharge chute preventing discharge of said chips through the other of said openings.

20. The power-operated plane of claim 18, wherein said retainer means has a pair of spring legs extending transversely of said housing and a chute retaining depression therebetween and the chip discharge chute has projections on the side thereof facing said retainer means adapted to be received in said depression to removably fix said chute to said housing.

21. A hand-manipulated, power-operated plane, comprising a housing, a shaft journalled in said housing for rotation about an axis extending transversely of the housing, a cutter mounted on said shaft, means detachably connecting said cutter to said shaft for rotation therewith, and a motor mounted in said housing and drive-connected to said shaft for rotating said cutter, said housing having an opening therein of greater diameter than said cutter through which said cutter can be slid off said shaft and removed from said housing, and a removable cover over said opening, the means for connecting the cutter to the cutter shaft comprising recesses in the end of said cutter opposite the opening in said housing and cooperating lugs on said shaft, said lugs being received in said recesses.

22. The plane of claim 21, wherein the motor is drive-connected to the cutter supporting shaft by pinions fixed to the ends of the cutter and motor shafts opposite the opening in the housing for rotation therewith, and an endless flexible, toothed belt drive-connecting said pinions.

23. The plane of claim 21, together with removable retainer means on the end of the shaft adjacent the opening in the housing for so positioning said cutter transversely of said housing that said lugs remain seated in said recesses.

References Cited

UNITED STATES PATENTS

| | | | |
|---|---|---|---|
| 795,997 | 8/1905 | Mathews | 145—4 |
| 1,418,328 | 6/1922 | Power | 145—4 |
| 2,540,258 | 2/1951 | Harris | 145—4 |
| 2,871,897 | 2/1959 | Hesse et al. | 145—4 |
| 2,894,549 | 7/1959 | Garland | 145—4 |
| 3,126,929 | 3/1964 | Pedersen | 145—4 |
| 3,207,195 | 9/1965 | Anton | 145—4 |

MILTON S. MEHR, *Primary Examiner.*